United States Patent
Weitzel

(10) Patent No.: US 6,710,113 B2
(45) Date of Patent: Mar. 23, 2004

(54) PROCESS FOR PREPARING TWO-PHASE POLYMERS IN THE FORM OF THEIR AQUEOUS DISPERSIONS AND WATER-REDISPERSIBLE POWDERS

(75) Inventor: Hans-Peter Weitzel, Reischach (DE)

(73) Assignee: Wacker Polymers Systems GmbH & Co. KG, Burghausen (DE)

( * ) Notice: Subject to any disclaimer, the term of this patent is extended or adjusted under 35 U.S.C. 154(b) by 204 days.

(21) Appl. No.: 09/908,525

(22) Filed: Jul. 18, 2001

(65) Prior Publication Data

US 2002/0035193 A1 Mar. 21, 2002

(30) Foreign Application Priority Data

Jul. 21, 2000 (DE) .......................................... 100 35 588

(51) Int. Cl.⁷ ...................... C08F 218/04; C08F 263/04; C08F 210/02; C08L 13/02
(52) U.S. Cl. .......................... 524/458; 526/73; 526/80; 526/87; 526/331
(58) Field of Search ............................ 524/458; 526/73, 526/80, 87, 331, 207; 525/201

(56) References Cited

U.S. PATENT DOCUMENTS

| | | | |
|---|---|---|---|
| 4,164,489 A | | 8/1979 | Daniels et al. |
| 5,135,988 A | * | 8/1992 | Meurer et al. ............... 525/302 |
| 5,747,578 A | * | 5/1998 | Schmitz et al. ............. 524/502 |
| 5,756,573 A | | 5/1998 | Trumbo et al. |

FOREIGN PATENT DOCUMENTS

| | | |
|---|---|---|
| DE | 1 918 327 | 10/1969 |
| DE | 26 14 261 | 10/1977 |
| DE | 4431343 | 3/1996 |
| DE | 19528380 | 2/1997 |
| DE | 19739936 | 3/1999 |
| DE | 198 53 461 A1 | 5/2000 |
| DE | 19853461 | 5/2000 |
| WO | WO 00/31159 | 6/2000 |
| WO | WO 0031159 A * | 6/2000 ......... C08F/263/04 |

OTHER PUBLICATIONS

Derwent Abstract corresponding to DE 4431343 (AN 1996–140409).
Derwent Abstract corresponding to DE 19739936 (AN 1999–205771).
Derwent Abstract corresponding to DE 19853461 (AN 2000–388606).
Derwent Abstract corresponding to DE 19528380 (AN 1997–111020).
Fox T.G., Bull. Am. Physics Soc. 1, 3, p. 123 (1956).
The Polymer Handbook, 2nd Edition, J. Wiley & Sons, New York (1975).
Derwent Abstract Corresponding To DE–A 1918327.
Derwent Abstract Corresponding To DE–A 2614261.

* cited by examiner

Primary Examiner—Kelechi C. Egwim
(74) Attorney, Agent, or Firm—Brooks Kushman P.C.

(57) ABSTRACT

A process for preparing two-phase polymers based on vinyl ester and ethylene in the form of their aqueous polymer dispersions or water-redispersible polymer powders by means of free-radical initiated emulsion or suspension polymerization of one or more vinyl esters of carboxylic acids having 1 to 12 carbon atoms and ethylene as monomers and, if desired, further monomers copolymerizable therewith, in the presence of one or more protective colloids and/or emulsifiers and, if desired, drying the resultant aqueous polymer dispersion, wherein a first polymerization phase takes place at a low ethylene pressure of P less than or equal to 20 bar and in a second polymerization phase raising the pressure to a level of greater than 20 bar to less than 60 bar, the polymer product having an ethylene distribution of less than or equal to 50% by weight of total ethylene from the first polymerization phase and greater than 50% by weight ethylene from the second polymerization phase.

13 Claims, No Drawings

PROCESS FOR PREPARING TWO-PHASE POLYMERS IN THE FORM OF THEIR AQUEOUS DISPERSIONS AND WATER-REDISPERSIBLE POWDERS

BACKGROUND OF THE INVENTION

1. Field of the Invention

The invention relates to a process for preparing two-phase polymers based on vinyl esters and ethylene, in the form of their aqueous polymer dispersions or water-redispersible polymer powders, by means of free-radical initiated emulsion or suspension polymerization of one or more vinyl esters of carboxylic acids having 1 to 12 carbon atoms and ethylene as monomers, optionally with further copolymerizable monomers, in the presence of one or more protective colloids and/or emulsifiers, followed when desired, by drying the resultant aqueous polymer dispersion.

2. Background Art

Protective-colloid-stabilized polymers are generally employed, in the form of their aqueous dispersions or as water-redispersible polymer powders, in a variety of applications. Examples include coating compositions or adhesives for use with a very wide variety of substrates, one example being their use in cementitious tile adhesives. Protective colloids used generally include polyvinyl alcohols. The use of polyvinyl alcohol is desirable since, in comparison to systems stabilized by low molecular weight compounds (emulsifiers), the protective colloid adds its own contribution to the adhesive strength, for example improved tensile bonding strength in tile adhesives. For applications in the coatings field, however, such as in interior and exterior paints and plasters, emulsifier- or cellulose-stabilized dispersions are often preferred on Theological grounds.

Monomers used to prepare redispersible powders have preferably included vinyl esters and ethylene, since stabilization of acrylic copolymers, styrene-acrylic copolymers, and styrene-butadiene copolymers by polyvinyl alcohol is difficult. In particular, stabilization of acrylate dispersions using polyvinyl alcohol alone such that the resulting powders are stable to blocking and also storage stable, is very difficult. However, because of their hydrophobic nature, these monomer combinations result in good strengths within the tile adhesive following wet storage and have little susceptibility to saponification. Thus, such polymer dispersions are quite desirable.

When using vinyl esters in combination with ethylene, formulating for stability to saponification necessitates a high ethylene content, which lowers the Tg. This may detract from the tensile adhesive strength of the tile adhesives, especially following storage at elevated temperatures. A constant and high level (at least 0.5 N/mm$^2$) of tensile adhesive strength is desirable for tile adhesives after all forms of storage, whether under dry, wet, elevated temperature, or frost conditions. Also desirable are high flexibilities coupled with high strengths, which are inherently contradictory properties. High flexibility requires a resin of low Tg, while high strength necessitates a resin of high Tg. Further contradictory requirements occur in the coatings sector, where for interior paints, good wet abrasion resistance coupled with low minimum film formation temperature are desired. For glossy paints, both high gloss and low blocking tendency are required.

Difficulties may arise not only during product preparation, but also during application of the products. Especially when polymers are used in the form of their redispersible powders to improve mortar properties, a principal use of redispersible powders, the formulations are required to remain stable over a certain period and must not undergo any significant alteration in their processing consistency (viscosity or cement stability). In the concrete and mortar industry, moreover, the mechanical properties, such as the compressive strength, the porosity and thus the air pore content are important factors. If there are too many air pores, the compressive strength falls sharply; if there are too few, or no air pores in the mortar or concrete, the building material lacks sufficient freeze/thaw stability. Hydraulically setting systems enhanced with dispersion powders are also formulated to increase adhesion relative to the unenhanced systems.

In an attempt to resolve some of the previously mentioned problems, DE 4431343 employs heterogeneous polyvinyl ester dispersions and polyvinyl ester powders comprising a mixture of a hard vinyl ester polymer and a soft vinyl ester-ethylene copolymer. The heterogeneous dispersions are prepared by mixing the corresponding polymer dispersions, which, if desired, can be subsequently dried to form powders.

DE 19739936 discloses a process wherein a soft vinyl ester-ethylene copolymer is first prepared as an aqueous dispersion. This vinyl ester-ethylene copolymer dispersion is then used as a seed latex in the polymerization of a hard vinyl ester polymer.

In DE 19528380, two-phase vinyl acetate-ethylene copolymers are produced by employing ethylene-rich copolymer phases at the beginning of the polymerization and low ethylene-content copolymer phases in subsequent courses of the polymerization. The aim of the process of DE 1952830 is to copolymerize as much ethylene as possible without developing crystalline polymer phases. However, these copolymers lack the desired high polymer film strengths, and are extremely soft.

DE 19853461 describes a process for preparing vinyl acetate-ethylene copolymers with a core/shell morphology in which, following the first stage, the process is interrupted by cooling, and the second stage is started anew. This process has disadvantages both from energy standpoints and because of the relatively long process time.

SUMMARY OF THE INVENTION

It was an object of the present invention to provide a stable copolymer dispersion and the corresponding water-redispersible dispersion powders thereof, the copolymers being based on vinyl esters and ethylene monomers which, especially when used in cementitious applications, possess both fully satisfactory viscosity stability and cement stability, which do not hinder setting of the cement, and which at the same time provide high elasticity and high strength. The polymers are obtainable by a process which allows two-phase polymers to be obtained without interruption of the polymerization. A yet further object was to provide powders which have improved and more uniform tensile bond strengths after all forms of storage. A further object was to provide dispersions which have improved wet abrasion resistance at low film formation temperatures.

DETAILED DESCRIPTION OF THE PREFERRED EMBODIMENT(S)

The invention provides a process for preparing two-phase polymers based on vinyl ester and ethylene in the form of their aqueous polymer dispersions or water-redispersible polymer powders by means of free-radical initiated emulsion or suspension polymerization of one or more vinyl esters of carboxylic acids having 1 to 12 carbon atoms and ethylene as monomers and optionally further monomers copolymerizable therewith, in the presence of one or more protective colloids and/or emulsifiers, and if desired, drying the resultant aqueous polymer dispersion, the process comprising polymerizing in a first polymerization phase at a low ethylene pressure of P less than or equal to 20 bar, followed by polymerizing in a second polymerization phase wherein the ethylene pressure is in the range of greater than 20 bar to less than 60 bar, resulting in an ethylene distribution in the polymer of less than 50% by weight in the first polymerization phase and of greater than 50% by weight in the second polymerization phase, based in each case on the total amount of ethylene used.

Suitable vinyl esters are those of carboxylic acids having 1 to 12 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 carbon atoms, examples being VeoVa9® or VeoVa10® (trade names of Shell). Vinyl acetate is particularly preferred. The vinyl esters are generally copolymerized with other monomers in an amount from 30 to 97% by weight, preferably from 70 to 95% by weight, based in each case on the overall weight of the monomers.

Ethylene is generally copolymerized in an amount of from 3 to 30% by weight, preferably from 3 to 15% by weight, based in each case on the overall weight of the monomers.

Examples of suitable further comonomers are esters of acrylic acid or methacrylic acid, vinyl halides such as vinyl chloride, and olefins such as propylene. Suitable methacrylic esters or acrylic esters are esters of unbranched or branched alcohols having 1 to 15 carbon atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate. These comonomers are copolymerized, if desired, in an amount of from 1 to 40% by weight, based on the overall weight of the monomers.

Optionally, from 0.05 to 10% by weight of auxiliary monomers, based on the overall weight of the monomer mixture, may be copolymerized. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters, maleic anhydride, and ethylenically unsaturated sulfonic acids and their salts, preferably vinylsulfonic acid and 2-acrylamido-2-methylpropanesulfonic acid. Further examples are precrosslinking comonomers such as polyethylenically unsaturated comonomers such as divinyl adipate, diallyl maleate, allyl methacrylate, and triallyl cyanurate, or postcrosslinking comonomers such as acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylacrylamide, of N-methylolmethacrylamide and of N-methylolallylcarbamate. Also suitable are epoxide-functional comonomers such as glycidyl methacrylate and glycidyl acrylate. Further examples are silicon-functional comonomers, such as acryloxypropyltri(alkoxy)silanes and methacryloxypropyltri(alkoxy)silanes, vinyl trialkoxysilanes, and vinylmethyldialkoxysilanes, examples of alkoxy groups being methoxy and ethoxy radicals and ethoxypropylene glycol ether radicals. Mention may also be made of monomers containing hydroxyl or CO groups, examples being methacrylic and acrylic acid hydroxyalkyl esters such as hydroxyethyl, hydroxypropyl or hydroxybutyl acrylate or methacrylate and also compounds such as diacetoneacrylamide and acetylacetoxyethyl acrylate or methacrylate.

Preference is given to comonomer mixtures of vinyl acetate with from 3 to 30% by weight of ethylene; comonomer mixtures of vinyl acetate with from 3 to 30% by weight of ethylene and from 1 to 50% by weight of one or more vinyl ester comonomers having 1 to 12 carbon atoms in the carboxylic acid radical such as vinyl propionate, vinyl laurate, vinyl esters of α-branched carboxylic acids having 9 to 11 carbon atoms such as VeoVa9, VeoVa10, VeoVa11; mixtures of vinyl acetate, from 3 to 30% by weight of ethylene, and preferably from 1 to 60% by weight of acrylic esters of branched or unbranched alcohols having from 1 to 15 carbon atoms, especially n-butyl acrylate or 2-ethylhexyl acrylate; mixtures with from 30 to 75% by weight of vinyl acetate, from 1 to 50% by weight of vinyl laurate or vinyl esters of an α-branched carboxylic acid having 9 to 11 carbon atoms, and from 1 to 30% by weight of acrylic esters of branched or unbranched alcohols having 1 to 15 carbon atoms, especially n-butyl acrylate or 2-ethylhexyl acrylate, which also contain from 3 to 30% by weight of ethylene; and mixtures of vinyl acetate, from 3 to 30% by weight of ethylene and from 1 to 30% by weight of vinyl chloride. The mixtures may also contain the abovementioned auxiliary monomers in the stated amounts. The amounts given in % by weight add up to 100% by weight in each case, based on all comonomers present in the resultant polymer.

Preparation takes place by emulsion polymerization or suspension polymerization processes, preferably by emulsion polymerization, the polymerization temperature being generally from 40° C. to 100° C., preferably from 60° C. to 90° C. The polymerization is initiated with the water-soluble or monomer-soluble initiators, or redox initiator combinations, that are customary for emulsion polymerization or suspension polymerization, respectively. Examples of water-soluble initiators are the sodium, potassium and ammonium salts of peroxydisulfuric acid, hydrogen peroxide, t-butyl peroxide, t-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The initiators are generally used in an amount of from 0.01 to 0.5% by weight, based on the overall weight of the monomers.

Redox initiators used are combinations of the abovementioned initiators with reducing agents. Suitable reducing agents are the sulfites and bisulfites of alkali metals and ammonium, an example being sodium sulfite, the derivatives of sulfoxylic acid such as zinc or alkali metal formaldehyde-sulfoxylates, for example, sodium hydroxymethanesulfonate, and (iso)ascorbic acid. The amount of reducing agent is preferably from 0.01 to 0.5% by weight, based on the overall weight of the monomers.

In order to control the molecular weight it is possible to use regulating substances (i.e. chain transfer agents) during the polymerization. If regulators are used, it is normally in amounts of from 0.01 to 5.0% by weight, based on the monomers to be polymerized, metered in separately or as a premix with other reaction components. Examples of such substances are n-dodecyl mercaptan, tert-dodecyl mercaptan, mercaptopropionic acid, methyl mercaptopropionate, isopropanol, and acetaldehyde. Preferably, no regulating substances are used.

Suitable protective colloids are partially saponified polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein, caseinates, soy protein, or gelatin; lignin sulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine-formaldehyde sulfonates, naphthalene-formaldehyde sulfonates, styrene-maleic acid copolymers and vinyl ether-maleic acid copolymers.

Preference is given to partially saponified or fully saponified polyvinyl alcohols. Particular preference is given to partially saponified polyvinyl alcohols having a degree of hydrolysis of from 80 to 95 mol % and a Höppler viscosity in 4% by weight aqueous solution of from 1 to 30 mPa·s (Höppler method at 20° C., DIN 53015). Also suitable are partially saponified, hydrophobically modified polyvinyl alcohols having a degree of hydrolysis of from 80 to 95 mol % and a Höppler viscosity in 4% by weight aqueous solution of from 1 to 30 mPa·s. Examples of such hydrophobically modified polyvinyl alcohols are partially saponified copolymers of vinyl acetate with hydrophobic comonomers such as isopropenyl acetate, vinyl pivalate, vinyl ethylhexanoate, vinyl esters of saturated, α-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably from 0.1 to 10% by weight, based on the overall weight of the partially saponified polyvinyl alcohols. Mixtures of the abovementioned polyvinyl alcohols may also be used.

Further suitable polyvinyl alcohols are partially saponified, hydrophobicized polyvinyl alcohols obtained by polymer-analogous reaction, an example being acetylization of the vinyl alcohol units with $C_1$ to $C_4$ aldehydes such as butyraldehyde. The fraction of the hydrophobic units is preferably from 0.1 to 10% by weight, based on the overall weight of the partially saponified polyvinyl acetate. The degree of hydrolysis is from 80 to 95 mol %, preferably from 85 to 94 mol %, the Höppler viscosity (DIN 53015, Höppler method, 4% by weight aqueous solution) from 1 to 30 mPa·s, preferably from 2 to 25 mPa·s.

Maximum preference is given to polyvinyl alcohols having a degree of hydrolysis of from 85 to 94 mol % and a Höppler viscosity, in 4% by weight aqueous solution, of from 3 to 15 mPa·s (Höppler method at 20° C., DIN 53015). Such protective colloids are attainable by means of processes known to the skilled worker.

The polyvinyl alcohols are generally used in a total amount of from 1 to 20% by weight, based on the overall weight of the monomers, in the polymerization.

In the process of the invention, it is also possible to carry out polymerization in the presence of emulsifiers, in which case the amounts of emulsifier are in general from 1 to 5% by weight based on the monomer weight. Suitable emulsifiers include anionic, cationic and nonionic emulsifiers, examples being anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters, including monoesters, of sulfosuccinic acid with monohydric alcohols or alkylphenols, or nonionic surfactants such as alkyl polyglycol ethers or alkylaryl polyglycol ethers having from 8 to 40 ethylene oxide units.

In a first polymerization phase, the polymerization is conducted at a low ethylene pressure of less than or equal to 20 bar, preferably from 5 to 20 bar, and, in a second polymerization phase, the pressure is raised to a level of greater than 20 bar and less than 60 bar, preferably from 25 bar to 55 bar. The effect of this change in ethylene pressure is that the ethylene is distributed in the polymer such that more than 50% by weight of total ethylene is incorporated in the second polymerization phase, i.e., a more ethylene-rich polymer phase is formed in the second polymerization phase. Generally, in the first phase of the polymerization, vinyl ester-ethylene copolymer phases having an ethylene content of from 2 to 10% by weight are formed and in the second phase of the polymerization, vinyl ester-ethylene copolymer phases having an ethylene content of from 10 to 30% by weight are formed.

By means of this measure, the polymerization is conducted such that, first, a polymer having a Tg greater than X° C. is formed, followed by the formation of a polymer having a Tg less than X° C. X is preferably about 10° C., with particular preference, about 15° C. The two polymer phases differ in their Tg such that the Tg difference is preferably from 5° C. to 30° C. The two polymer phases are present in random distribution over all of the volume elements of the polymer particles. The polymer phase formed in the first phase preferably represents not more than 60% by weight, in particular from 30 to 60% by weight, of the overall polymer.

The glass transition temperature Tg of the polymers may be determined in a known manner by means of differential scanning calorimetry (DSC). The Tg may also be calculated in advance approximately by means of the Fox equation. According to T. G. Fox, BULL. AM. PHYSICS SOC. 1, 3, page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in degrees Kelvin, of the homopolymer of the monomer n. Tg values for homopolymers are listed in POLYMER HANDBOOK, 2nd Edition, J. Wiley & Sons, New York (1975). When there are slight differences in the Tg, it is often impossible to resolve these differences or detect them by measurement, and they can be calculated only through the monomer composition by means of the Fox equation.

The further monomers, especially the vinyl ester monomers, may be included in their entirety in the initial charge, metered in in their entirety, or included in part in the initial charge with the remainder metered in after the polymerization has been initiated. A preferred procedure is to include from 20 to 100% by weight, with particular preference from 50 to 100% by weight, based on the overall weight of the monomers, in the initial charge, and to meter in the remainder. The feeds may be carried out separately (spatially and temporally) or some or all of the components for metering may be emulsified first and then metered in. Depending on their chemical nature, the auxiliary monomers may likewise all be included in the initial charge or metered in. Partial inclusion in the initial charge, and partial metering, are also possible. In the case of vinyl acetate polymerizations, the auxiliary monomers may be metered in or included in the initial charge as a function of their copolymerization parameters. Acrylic acid derivatives, for example, are generally metered in, whereas vinylsulfonate can be included in the initial charge.

The monomer conversion is controlled with the initiator feed. The initiators are metered in in their entirety. The protective colloid fraction and/or emulsifier fraction may either be included solely in the initial charge or else partly included in the initial charge and partly metered in. It is preferred to include at least 5% by weight of the protective colloid in the initial charge; most preferably, all the protective colloid fraction is included in the initial charge.

After the end of the polymerization, the batch may be postpolymerized using known methods in order to remove residual monomers, by means, for example, of postpolymerization initiated with redox catalysts. Volatile residual monomers may also be removed by means of distillation, preferably under reduced pressure, and, if desired, with the passage of inert entraining gases such as air, nitrogen or steam through or over the batch.

The aqueous dispersions obtainable by the process of the invention have a solids content of from 30 to 75% by weight, preferably from 50 to 60% by weight. In order to prepare the water-redispersible polymer powders, the aqueous dispersions, optionally following the addition of protective colloids as a spraying aid, are dried, for example by means of fluidized bed drying, freeze drying or spray drying. Preferably, the dispersions are spray dried. Spray drying is carried out in conventional spray drying units, where atomization can take place by means of single-fluid, two-fluid or multifluid nozzles or with a rotating disk. The exit temperature is generally chosen in a range from 45° C. to 120° C., preferably from 60° C. to 90° C., depending on the unit, the Tg of the resin, and the desired degree of drying.

In general, the spraying aid is used in a total amount of from 3 to 30% by weight, based on the polymer constituents of the dispersion. In other words, the total amount of protective colloid before the drying operation should be at least 3 to 30% by weight, based on the polymer fraction; it is preferred to use from 5 to 20% by weight based on the polymer fraction.

Suitable spraying aids are partially saponified polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein, caseinates, soy protein, or gelatin; lignin sulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine-formaldehyde sulfonates, naphthalene-formaldehyde sulfonates, styrene-maleic acid copolymers and vinyl ether-maleic acid copolymers. Preferably, no protective colloids other than polyvinyl alcohols are used as spraying aids.

At the spraying stage it has in many cases proven advantageous to include up to 1.5% by weight of antifoam, based on the base polymer. In order to extend the storage life by improving the blocking stability, especially in the case of powders having a low glass transition temperature, the resulting powder may be provided with an antiblocking (anticaking) agent, preferably up to 30% by weight, based on the overall weight of polymeric constituents. Examples of antiblocking agents are Ca and Mg carbonate, talc, gypsum, silica, kaolins, and silicates, preferably those having particle sizes in a range from 10 nm to 10 μm.

The viscosity of the feed to be sprayed is adjusted by way of the solids content so as to provide a viscosity of less than 500 mPa·s (Brookfield viscosity at 20 revolutions and 23° C.), preferably less than 250 mPa·s. The solids content of the dispersion to be sprayed is preferably 35%, more preferably greater than 40%.

In order to improve the performance properties, further additives may be added at the spraying stage. Examples of further constituents of dispersion powder compositions, present in preferred embodiments, are pigments, fillers, foam stabilizers, and hydrophobicizers.

The aqueous polymer dispersions and the water-redispersible, protective-colloid-stabilized polymer powders prepared therefrom may be employed in the fields of application typical for them: in chemical products for the construction industry, for example, alone or in conjunction with hydraulically setting binders such as cements (Portland, aluminate, pozzolanic, slag, magnesia, and phosphate cement), gypsum and water glass, for the production of building adhesives, especially tile adhesives and exterior insulation adhesives, plasters and renders, filling compounds, trowel-applied flooring compounds, leveling compounds, grouts, jointing mortars, and paints; and also as binders for coating compositions and adhesives or as coating and/or binding materials for textiles and paper.

The examples which follow serve to illustrate the invention.

EXAMPLE 1

A 600 l autoclave was charged with 152 kg of deionized water, 116 kg of 20% strength aqueous solution of a polyvinyl alcohol having a degree of hydrolysis of 88 mol % and a Höppler viscosity of 4 mPa·s, and 232 kg of vinyl acetate. The pH was adjusted to 4.0 using formic acid and the autoclave was evacuated. Subsequently, at 55° C., 10 bar of ethylene was injected, corresponding to an ethylene content of 10 kg.

To start the polymerization, the initiator feeds., 3% aqueous tert-butyl hydroperoxide solution and 5% strength aqueous ascorbic acid solution, were metered in, each at 750 g/h. The internal temperature was limited to 75° C. by external cooling. 60 minutes after the beginning of the reaction, the ethylene pressure was raised to 50 bar and the vinyl acetate feed was begun. 57.8 kg of vinyl acetate were metered in at a rate of 38.5 kg/h. Ethylene was added up to a quantity of 30 kg. After the end of the reaction, the autoclave was cooled, excess ethylene was released, and the polymer was postpolymerized in order to remove residual monomer. For the postpolymerization, 1,100 g of tert-butyl hydroperoxide as a 10% strength aqueous solution, and 2,200 g of ascorbic acid as a 5% strength aqueous solution, were added in succession. Subsequently, the dispersion was discharged through a 500 μm sieve, yielding a dispersion having the following characteristics:

| | |
|---|---|
| Solids content: | 55.6% |
| Viscosity (Brookfield 20 rpm): | 410 mPa · s |
| pH: | 3.9 |
| Minimum film formation temperature: | 3° C. |
| Tg: | 14° C. |

EXAMPLE 2

(Comparative)

A dispersion was prepared following the procedure of example 1, except that ethylene was distributed as follows: initial charge 20 bar/17 kg, subsequent feed 40 bar/13 kg, yielding a dispersion having the following characteristics:

| | |
|---|---|
| Solids content: | 55.4% |
| Viscosity (Brookfield 20 rpm): | 486 mPa · s |
| pH: | 3.9 |
| Minimum film formation temperature: | 5.5° C. |
| Tg: | 17° C. |

EXAMPLE 3

A dispersion was prepared following procedure of example 1, except ethylene was distributed as follows: initial charge 13 bar/13 kg, subsequent feed 45 bar/17 kg, yielding a dispersion having the following characteristics:

| | |
|---|---|
| Solids content: | 55.2% |
| Viscosity (Brookfield 20 rpm): | 395 mPa · s |
| pH: | 3.7 |
| Minimum film formation temperature: | 5° C. |
| Tg: | 19° C. |

EXAMPLE 4

A dispersion was prepared following the procedure of Example 1, except that ethylene was distributed as follows: initial charge 8 bar/7 kg, subsequent feed 55 bar/23 kg, yielding a dispersion having the following characteristics:

| | |
|---|---|
| Solids content: | 55.8% |
| Viscosity (Brookfield 20 rpm): | 483 mPa · s |
| pH: | 3.8 |
| Minimum film formation temperature: | 6° C. |
| Tg: | 20° C. |

EXAMPLE 5

(Comparative)

A dispersion was prepared following the procedure of example 1, except that ethylene was distributed as follows: initial charge 21 bar/20 kg, feed 38 bar/10 kg, yielding a dispersion having the following characteristics:

| | |
|---|---|
| Solids content: | 57.3% |
| Viscosity (Brookfield 20 rpm): | 605 mPa · s |
| pH: | 4.1 |
| Minimum film formation temperature: | 6° C. |
| Tg: | 15° C. |

EXAMPLE 6

(Comparative)

A dispersion was prepared following the procedure of example 1, except that ethylene was distributed as follows: initial charge 40 bar/28 kg, subsequent feed 40 bar/2 kg, yielding a dispersion having the following characteristics:

| | |
|---|---|
| Solids content: | 55.8% |
| Viscosity (Brookfield 20 rpm): | 505 mPa · s |
| pH: | 4.2 |
| Minimum film formation temperature: | 6.5° C. |
| Tg: | 16° C. |

EXAMPLE 7

A dispersion was prepared following the procedure of example 1, except ethylene was distributed as follows: initial charge 18 bar/16 kg, subsequent feed 50 bar/22 kg. In this example, part of the vinyl acetate was replaced by VeoVa10, distributed as follows: 174 kg of vinyl acetate in the initial charge, and 58 kg of vinyl acetate and 58 kg of VeoVa10 in the feed. The product dispersion had the following characteristics:

| | |
|---|---|
| Solids content: | 54.7% |
| Viscosity (Brookfield 20 rpm): | 1220 mPa · s |
| pH: | 3.7 |
| Minimum film formation temperature: | 5.5° C. |
| Tg: | −4° C./23° C. |

EXAMPLE 8

(Comparative)

A dispersion was prepared following the procedure of example 1, except that ethylene was distributed as follows: initial charge 32 bar/23 kg, subsequent feed 44 bar/15 kg. Part of the vinyl acetate was replaced by VeoVa10, distributed as follows: 174 kg of vinyl acetate and 58 kg of VeoVa10 in the initial charge. 58 kg of vinyl acetate in the feed.

The product dispersion had the following characteristics:

| | |
|---|---|
| Solids content: | 55.6% |
| Viscosity (Brookfield 20 rpm): | 950 mPa · s |
| pH: | 4.1 |
| Minimum film formation temperature: | 0° C. |
| Tg: | 3° C. |

EXAMPLE 9

A dispersion was prepared following the procedure of example 1, except that ethylene was distributed as follows: initial charge 17 bar/13 kg, subsequent feed 55 bar/31 kg. The dispersion was stabilized by using 62 kg of a 20% strength solution of a polyvinyl alcohol having a degree of hydrolysis of 88 mol % and a Höppler viscosity of 4 mPa·s, and 41 kg of a 10% strength solution of polyvinyl alcohol having a degree of hydrolysis of 88 mol % and a Höppler viscosity of 25 mPa·s. The amount of water in the initial charge was 140 kg. 255 kg of vinyl acetate were included completely in the initial charge.

The product dispersion had the following characteristics:

| | |
|---|---|
| Solids content: | 50.0% |
| Viscosity (Brookfield 20 rpm): | 540 mPa · s |

| | |
|---|---|
| pH: | 3.1 |
| Minimum film formation temperature: | 5° C. |
| Tg: | 3° C./23° C. |

EXAMPLE 10

(Comparative)

A dispersion was prepared following the procedure of example 9, except that ethylene was distributed as follows: initial charge 28 bar/25 kg, subsequent feed 45 bar/19 kg. Part of the vinyl acetate was replaced by VeoVa10. The monomers were distributed as follows: 174 kg of vinyl acetate in the initial charge. 58 kg of vinyl acetate and 58 kg of VeoVa10 in the feed.

The product dispersion had the following characteristics:

| | |
|---|---|
| Solids content: | 49.8% |
| Viscosity (Brookfield 20 rpm): | 615 mPa · s |
| pH: | 3.4 |
| Minimum film formation temperature: | 0° C. |
| Tg: | 10° C. |

EXAMPLE 11

A dispersion was prepared following the procedure of example 1, except that ethylene was distributed as follows: initial charge 9 bar/8 kg, subsequent feed 55 bar/31 kg. The dispersion was stabilized by using 16 kg of a 28% strength solution of a nonylphenol ethoxylate containing 10 EO units, 18 kg of a 25% strength solution of a nonylphenol ethoxylate containing 23 EO units and 1.26 kg of a 20% strength solution of a dodecylbenzenesulfonate, 71 kg of a 3.3% strength solution of hydroxyethylcellulose, and 1.8 kg of a 25% strength solution of vinylsulfonate. The amount of water in the initial charge was 102 kg. 52 kg of vinyl acetate were included in the initial charge, 210 kg were metered in, yielding a dispersion having the following characteristics:

| | |
|---|---|
| Solids content: | 55.0% |
| Viscosity (Brookfield 20 rpm): | 2340 mPa · s |
| pH: | 3.7 |
| Minimum film formation temperature: | 4° C. |
| Tg: | −1° C./22° C. |

EXAMPLE 12

(Comparative)

A dispersion was prepared following the procedure of example 1, except that ethylene was distributed as follows: initial charge 35 bar/20 kg, subsequent feed 35 bar/19 kg. The dispersion was stabilized by using 16 kg of a 28% strength solution of a nonylphenol ethoxylate containing 10 EO units, 18 kg of a 25% strength solution of a nonylphenol ethoxylate containing 23 EO units, 1.26 kg of a 20% strength solution of a dodecylbenzenesulfonate, 71 kg of a 3.3% strength solution of hydroxyethylcellulose, and 1.8 kg of a 25% strength solution of vinylsulfonate. The amount of water in the initial charge was 102 kg. 52 kg of vinyl acetate were included in the initial charge, 210 kg were metered in, yielding a dispersion having the following characteristics:

| | |
|---|---|
| Solids content: | 56.4% |
| Viscosity (Brookfield 20 rpm): | 1690 mPa · s |
| pH: | 3.9 |
| Minimum film formation temperature: | 3° C |
| Tg: | 12° C. |

Powder Preparation

The dispersions from examples 1 to 10 were admixed with 5% by weight (solids/solids) of polyvinyl alcohol having a degree of hydrolysis of 88 mol % and a Höppler viscosity of 4 mPa·s and were diluted with water to a spray viscosity of 250 mPa·s. The dispersion was then sprayed using a two-fluid nozzle. The spraying component used was air precompressed to 4 bar, and the droplets formed were dried concurrently with air heated to 125° C. The dry powder obtained was admixed with 10% by weight of a commercially available antiblocking agent, a mixture of calcium magnesium carbonate and magnesium hydrosilicate.

Redispersion Behavior ("R") of the Polymer Films

The above dispersions were used to prepare 0.2 mm thick films of the dispersions of the above examples (before spray drying) on glass plates, and dried at 105° C. for 15 minutes. To examine the film redispersibility, one drop of water was applied to a homogeneous site of the test film using a pipette at room temperature, and after leaving it to act for 60 seconds, the water drop was rubbed at the same site using the fingertip until the glass plate at this site was film-free, the film fragmented, or the film retained its integrity completely. The redispersibility of the polymer films was assessed using the following evaluation scheme:

Rating 1: Film can be redispersed immediately by slight rubbing or redisperses automatically;

Rating 2: Film can be redispersed by rubbing, although film fragments of low redispersibility are possible;

Rating 3: Film can be redispersed only by vigorous rubbing, and film fragments are formed;

Rating 4: Film cannot be redispersed even by prolonged vigorous rubbing, but instead fragments.

Determination of Blocking Resistance ("B")

To determine blocking resistance, the dispersion powder was placed in an iron tube with a thread and then subjected to the load of a metal ram. Loading was followed by storage at 50° C. for 16 hours in a drying cabinet. After cooling to room temperature, the powder was removed from the tube and the blocking stability was determined qualitatively by crushing the powder. The blocking stability was classified as follows:

1=very good blocking stability
2=good blocking stability
3=satisfactory blocking stability
4=not stable to blocking, powder after crushing is no longer free-flowing.

Determination of the Cement Stability ("CS")

A Cement Mixture was Prepared by Stirring to the Following Formulation

| | |
|---|---|
| Portland cement | 82.5 g |
| Calcite (CaCO₃) 10–40 mm | 75 g |
| Quartz sand 200–500 mm | 142 g |
| Dispersion powder | 14.5 g |
| Water | 85 g |

The processability of this mixture was observed over a period of 2 hours and assessed qualitatively.

Elongation at break EB (%) and tensile strength TS (N/mm²) were determined on dried dispersion films with a dry-film thickness of approximately 200 μm in a tensile test according to DIN 53504.

The wet abrasion resistance (examples 11 and 12 (comparative)) was determined on interior paints at a pigment volume concentration ("PVC") of 75, according to DIN 53778 Part 2.

The percentage of ethylene is incorporated into the first polymer phase was determined by means of weighing.

The procedure of the invention leads in every case to readily redispersible and cement-stable dispersions and powders, respectively; the powders exhibit good blocking stabilities and thus good stabilities on storage. The dispersions of the invention show significant improvements in the tensile strengths at comparable elongation, relative to the comparative dispersions. The wet abrasion resistance (comparison of example 11 with Example 12 (comparative)) is significantly improved by the binders of the invention. The test results are summarized in Table 1.

TABLE 1

| Example | SC (%) | pH | BF20 (mPa·s) | MFFT (°C.) | Tg (°C.) | E* (wt. %) | EB (%) | TS (N/mm²) | R | B | CS |
|---|---|---|---|---|---|---|---|---|---|---|---|
| 1 | 55.6 | 3.9 | 410 | 3 | 14 | 33.3 | 426 | 18.6 | 1 | 1 | yes |
| 2 | 55.4 | 3.9 | 486 | 5.5 | 17 | 56.7 | 357 | 15.1 | 1 | 1 | yes |
| 3 | 55.2 | 3.7 | 395 | 5 | 19 | 43.3 | 278 | 17.2 | 1 | 1 | yes |
| 4 | 55.8 | 3.8 | 483 | 6 | 20 | 23.3 | 370 | 20.0 | 1 | 1 | yes |
| 5 | 57.3 | 4.1 | 605 | 6 | 15 | 66.7 | 373 | 16.1 | 1 | 1 | yes |
| 6 | 55.8 | 4.2 | 505 | 6.5 | 16 | 93.3 | 340 | 15.5 | 1 | 1 | yes |
| 7 | 54.7 | 3.7 | 1220 | 5.5 |  | 42.1 | 367 | 15.6 | 1 | 1 | yes |
| 8 | 55.6 | 4.1 | 950 | 0 | 3 | 60.5 | 460 | 7.9 | 1 | 1 | yes |
| 9 | 50.0 | 3.1 | 540 | 5 |  | 29.5 | 409 | 21.3 | 1 | 1 | yes |
| 10 | 49.8 | 3.4 | 615 | 0 | 10 | 56.8 | 470 | 16.3 | 1 | 1 | yes |
|  |  |  |  |  |  |  |  | wet abrasion (cycles) |  |  |  |
| 11 | 55.0 | 3.7 | 2340 | 4 |  |  |  | 2000 |  |  |  |
| 12 | 56.4 | 3.9 | 1690 | 3 | 12 |  |  | 1000 |  |  |  |

*Amount of ethylene in the initial charge, based on total amount of ethylene

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing two-phase polymers based on vinyl ester(s) and ethylene, in the form of their aqueous polymer dispersions or water-redispersible polymer powders, comprising polymerizing one or more vinyl esters of carboxylic acids having 1 to 12 carbon atoms and ethylene as monomers and optionally further monomers copolymerizable therewith by means of free-radical initiated emulsion or suspension polymerization, in the presence of one or more protective colloids and/or emulsifiers, and optionally drying the resultant aqueous polymer dispersion, wherein said polymerizing takes place in minimally two steps, said steps comprising polymerizing ethylene in a first polymerization phase at a low ethylene pressure less than or equal to 20 bar, and in a second polymerization phase, increasing the ethylene pressure to greater than 20 bar and less than 60 bar, wherein the resultant polymer has an ethylene distribution of less than 50% by weight resulting from the first polymerization phase and greater than 50% by weight resulting from the second polymerization phase, based in each case on the total amount of ethylene in said polymer.

2. The process of claim 1, wherein in the first polymerization phase, vinyl ester-ethylene copolymer phases having an ethylene content of from 2 to 10% by weight, and in the second polymerization phase polymerization vinyl ester-ethylene copolymer phases having an ethylene content of from greater than 10 to 30% by weight, are formed.

3. The process of claim 1, wherein from 20 to 100% by weight of the vinyl ester monomers and any further nonethylene comonomers during the first polymerization phase, during the second polymerization phase or during both the first and second polymerization phases, are included in the initial charge at the first polymerization phase, and any remainder is metered in during the first polymerization phase, during the second polymerization phase or during both the first and second polymerization phases.

4. The process of claim 1, wherein the vinyl esters are copolymerized in an amount of from 30 to 97% by weight and ethylene is copolymerized in an amount of from 3 to 30% by weight, based in each case on the overall weight of the monomers.

5. The process of claim 1, wherein comonomer mixtures of vinyl acetate with from 3 to 30% by weight of ethylene;

comonomer mixtures of vinyl acetate with from 3 to 30% by weight of ethylene and from 1 to 50% by weight of one or more further vinyl ester comonomers having 1 to 12 carbon atoms in the carboxylic acid radical;

mixtures of vinyl acetate, from 3 to 30% by weight of ethylene and from 1 to 60% by weight of acrylic esters of branched or unbranched alcohols having from 1 to 15 carbon atoms;

mixtures of 30 to 75% by weight of vinyl acetate, from 1 to 50% by weight of vinyl laurate or vinyl esters of an α-branched carboxylic acid having 9 to 11 carbon atoms, from 1 to 30% by weight of acrylic esters of branched or unbranched alcohols having 1 to 15 carbon atoms, and 3 to 30% by weight of ethylene; or mixtures of vinyl acetate, from 3 to 30% by weight of ethylene and from 1 to 30% by weight of vinyl chloride, are copolymerized, optionally with auxiliary monomers, and wherein the amounts in % by weight add up to 100% by weight based on the overall weight of all the monomers.

6. The process of claim 1, wherein the polymerizing is an emulsion polymerization process.

7. The process of claim 1, wherein the polymerizing takes place in the presence of one or more protective colloids selected from the group consisting of partially saponified polyvinyl alcohols and partially saponified, hydrophobically modified polyvinyl alcohols, and mixtures thereof each having a degree of hydrolysis of from 80 to 95 mol % and a Höppler viscosity in a 4% strength aqueous solution of from 1 to 30 mPa·s.

8. The process of claim 1, wherein the drying of the aqueous dispersion obtained thereby takes place by means of spray drying, optionally with the addition of further protective colloids as spraying aids.

9. A two-phase polymer based on vinyl ester and ethylene in the form of its aqueous dispersion or water-redispersible powder, prepared by the process of claim 1, wherein the difference of the glass transition temperature Tg of the two polymer phases is from 5° C. to 30° C.

10. The two-phase polymer of claim 9, wherein the two polymer phases are present in random distribution over the volume elements of the polymer particles.

11. In a building product selected from the group consisting of inorganic, hydraulically setting binders, building adhesives, plasters, renders, filling compounds, trowel-applied flooring compounds, leveling compounds, grouts, jointing mortars, and paints, the improvement comprising employing as an aqueous polymer dispersion or redispersible polymer powder, the aqueous two phase polymer dispersion or redispersible powder of claim 1.

12. In a binder for a coating composition, a paint, or an adhesive, the improvement comprising employing as an aqueous polymer dispersion or redispersible polymer powder, the aqueous two phase polymer dispersion or redispersible powder of claim 1.

13. In a textile paper coating or binding material employing a polymer dispersion or redispersible polymer powder, the improvement comprising employing as said polymer dispersion or redispersible polymer powder the two phase polymer dispersion or redispersible powder of claim 1.

* * * * *